United States Patent
Jo et al.

(10) Patent No.: US 7,887,772 B2
(45) Date of Patent: Feb. 15, 2011

(54) ULTRAFINE POROUS GRAPHITIC CARBON FIBER AND PREPARATION METHOD THEREOF

(75) Inventors: Seong-Mu Jo, Seoul (KR); Dong-Young Kim, Seoul (KR); Byung-Doo Chin, Gyeonggi-do (KR); Sung-Eun Hong, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 395 days.

(21) Appl. No.: 11/607,520

(22) Filed: Dec. 1, 2006

(65) Prior Publication Data

US 2007/0134151 A1    Jun. 14, 2007

(30) Foreign Application Priority Data

Dec. 14, 2005    (KR) ...................... 10-2005-0123455

(51) Int. Cl.
    *D01F 9/12*    (2006.01)
(52) U.S. Cl. .............. 423/447.1; 423/447.2; 423/447.4; 423/448
(58) Field of Classification Search ....... 423/447.1–448
    See application file for complete search history.

(56) References Cited

U.S. PATENT DOCUMENTS 5,753,387 A * 5/1998 Takami et al. ............... 429/332
5,772,974 A * 6/1998 Ohashi et al. ............ 423/447.7

FOREIGN PATENT DOCUMENTS

| JP | 2001-58807 | 3/2001 |
| JP | 2001-110689 | 4/2001 |
| JP | 2002-8954 | 1/2002 |
| JP | 2003-137517 | 5/2003 |

OTHER PUBLICATIONS

Chung et al. "Electrospun Poly(vinylidene fluoride)-based Carbon Nanofibers for Hydrogen Storage." Mater. Res. Soc. Symp. Proc. vol. 837. 2005 (No month listed).*

(Continued)

*Primary Examiner*—Scott Kastler
*Assistant Examiner*—Brian Walck
(74) *Attorney, Agent, or Firm*—Fish & Richardson P.C.

(57) ABSTRACT

The present invention discloses an ultrafine graphitic carbon fiber and a preparation method thereof. An ultrafine fiber having a diameter of 1 to 3000 nm is prepared by electrospinning a halogenated polymer solution containing a metal compound inducing graphitization. In carbonization, an ultrafine porous graphitic carbon fiber having a large specific surface area, micropores and macropores is prepared by the graphitization by a metal catalyst generated from the metal compound. The ultrafine carbon fiber can be used as a carbon material for storing hydrogen, an adsorbing material of biochemically noxious substances, an electrode material of a supercapacitor, a secondary cell and a fuel cell, and a catalyst carrier material.

16 Claims, 4 Drawing Sheets

OTHER PUBLICATIONS

Kim et al. "Characteristics of supercapaitor [sic] electrodes of PBI-based carbon nanofiber web prepared by electrospinning." Electrochimica Acta. 50. pp. 877-881. Aug. 6, 2004.*

Yamashita, et al., "Activated carbon fibers and films derived from poly(vinylidene fluoride)", Department of Organic and Polymeric Materials, Tokyo Insitute of Technology, Jun. 4, 1999.

Hou et al., "Carbon Nanotubes on Carbon Nanofibers: A Novel Structure Based on Electrospun Polymer Nanofibers", Jan. 2004.

Park et al., Effects of iron catalyst on the formation of crystalline domain during carbonization of electrospun acrylic nanofiber, Division of Applied Chemical Engineering, Hanyang University, Republic of Korea, Jul. 2004, pp. 265-270.

* cited by examiner

ULTRAFINE POROUS GRAPHITIC CARBON FIBER AND PREPARATION METHOD THEREOF

BACKGROUND OF THE INVENTION

1. Field of the Invention

The present invention relates to a special functional carbon nano material such as a carbon material for storing and recovering a gas such as hydrogen or natural gas, a carbon material for separating and refining a liquid or gas, and a carbon material for a high capacity electrode of a cell or a super capacitor, and more particularly, to an ultrafine porous graphitic carbon fiber prepared by carbonizing an electrospun ultrafine fiber of halogenated polymers containing a graphitizing catalyst, and a preparation method thereof.

2. Description of the Background Art

Recently, a lightweight carbon material which can adsorb hydrogen or methane having a high vapor pressure in the normal temperature at a high concentration has drawn attention. An activated carbon adsorbs at least about 15 wt % of methane gas at 25° C. in 35 pressure. A methane natural gas is charged in a high pressure vessel made of non-rusted steel with 200 pressure and used for a natural gas bus. In addition, a fuel cell electric vehicle using hydrogen enters into a road driving test stage. When a storage pressure of the hydrogen or compressed natural gas increases, a storage ability also increases. However, since a strong heavy storage tank is mounted, a high density adsorption carbon material for hydrogen or gas is necessary.

Required are a high reliability high capacitance small-sized capacitor which is a backup power source of a small-sized electronic device, and a high capacitance capacitor for packet transmission of a digital camera memory or a cellular phone which can instantaneously supply power. Especially, for practical use of a hybrid vehicle or an electric vehicle, a high capacitance electric double layer capacitor (EDLC) is required as an auxiliary power source (power assist) of an internal engine (gasoline, diesel, LPG or CNG engine), a secondary cell for power supply or a fuel cell. The characteristics required in the carbon material for the capacitor electrode having high capacitance or the high density gas adsorption include a large specific surface area and high conductivity. A pore volume capacity, a pore micropore size distribution, a geometrical pore structure and a chemical pore property are also very important.

The size of the pores by the activated carbon is a critical factor of a gas adsorption process. Therefore, the size of the pores must be very similar to the size of the gas molecules to be adsorbed. For example, adsorption of methane having a molecular diameter of 0.38 nm is dependent upon the volume of the micropores of the activated carbon. In the pore size distribution of the used activated carbon, a pore size width of 0.6 to 1.0 nm occupies the largest volume. The effective pore size width of the activated carbon adsorption is 0.78 nm. The micropores are more advantageous in adsorption over a critical temperature than the macropores. A grain or powder phase material such as the activated carbon needs molding in use. Here, the performance of the material may be deteriorated due to an additive for shape stability such as a polymer binder. Conversely, a fibrous carbon material such as a carbon fiber or an activated carbon fiber does not have the foregoing problem. In the case of the fibrous carbon material, a size of pores can be easily controlled in carbonization. A thin diameter of a fiber is advantageous in formation of microporous carbon. On the other hand, the activated carbon or the activated carbon fiber is prepared by activating the carbon material to enlarge a specific surface area. The activation process enlarges the specific surface area, but also increases the macropores and the micropores. It is thus difficult to control the pore size distribution.

The carbon material prepared by carbonizing halogenated polymers such as poly(vinylidene chloride), poly(vinylidene fluoride), poly(vinyl chloride), and copolymers thereof has a large specific surface area and a well-controlled pore size without the activation process, and thus draws great attention in the industrial or scientific fields. The carbon material can be efficiently used for high energy storage and electrochemical devices. Accordingly, if the ultrafine fiber of the halogenated polymers is used as a carbon fiber precursor, the prepared carbon material is expected to have very excellent performance. However, the ultrafine carbon fiber is not yet prepared due to low thermal stability and fiber forming ability.

SUMMARY OF THE INVENTION

Therefore, an object of the present invention is to provide an ultrafine porous carbon fiber of halogenated polymers which cannot be easily prepared by a general fiber preparation process, especially, a graphitic carbon fiber.

Another object of the present invention is to provide an ultrafine graphitic carbon fiber having a large specific surface area and a well-controlled pore size to be used for gas adsorption or energy storage.

To achieve these and other advantages and in accordance with the purpose of the present invention, as embodied and broadly described herein, there is provided an ultrafine porous graphitic carbon fiber prepared by forming an ultrafine fiber by electrospinning halogenated polymers containing a graphitizing catalyst compound, and performing carbonization accompanied by graphitization.

Generally, the graphitic carbon fiber is prepared by graphitization at a high temperature of 2000 to 3000° C. In accordance with the present invention, the graphitic carbon fiber can be prepared below 2000° C. which is a general carbon fiber preparation temperature, preferably, at 800 to 1800° C. by containing a metal catalyst.

Since a general graphitized fiber is prepared by crystallizing a carbon fiber at a high temperature of 2000 to 3000° C., the specific surface area of the graphitized fiber is below a few tens $m^2/g$. However, in accordance with the present invention, the specific surface area of the graphitic carbon fiber is over a few hundreds $m^2/g$. In addition, the graphitic carbon fiber is a porous fiber having micropores and mesopores, and an ultrafine fiber having a nano meter level diameter.

In accordance with the present invention, the graphitic carbon fiber has a large specific surface area by the micropores, and also has $d_{002}$ below 0.36 nm.

$d_{002}$ of a natural graphite is 0.335 nm and $d_{002}$ of an amorphous carbon is over 0.37 nm. In accordance with the present invention, $d_{002}$ of the graphitic carbon fiber is below 0.36 nm, namely, ranges from 0.33 to 0.35 nm approximately to the natural graphite.

There is also provided a preparation method of an ultrafine porous graphitic carbon fiber, including the steps of: preparing a halogenated polymer ultrafine fiber by using halogenated polymers containing a graphitizing metal catalyst or a graphitizing metal catalyst compound; performing a non-melting treatment on the halogenated polymer ultrafine fiber; and carbonizing the non-melting treated ultrafine fiber.

In accordance with the present invention, the ultrafine fiber of the halogenated polymers which cannot be easily prepared by a general fiber preparation process can be prepared by electrospinning. The ultrafine fiber having a diameter of 1 to 3000 nm is prepared by electrospinning the halogenated polymer solution containing the graphitizing metal catalyst compound. Preferably, the ultrafine fiber has a diameter of 1 to 1000 nm for uniform dehalogenation and uniform structure in carbonization.

Exemplary halogenated polymers include single polymers and copolymers of fluorine such as poly(vinylidene fluoride), poly(vinylidenefluoride-co-hexafluoropropylene), poly(vinylidenefluoride-co-tetrafluoro ethylene), poly(vinylidene fluoride-co-trifluoroethylene) and perfluoropolymers, single polymers and copolymers of halogenated monomers such as poly(vinyl chloride), poly(vinylidene chloride), poly(vinylidenechloride-co-vinylchloride) and saran polymers, and mixtures thereof.

Exemplary graphitizing catalysts or graphitizing catalyst compounds contained in the halogenated polymer solution include nano grains of transition metals such as Pt, Ru, Cu, Fe, Ni, Co, Pd, W, Ir, Rh, Sr, Ce, Pr, Nd, Sm and Re, mixtures thereof, non-transition metals such as Mg, B and Al, and mixtures of Mg and transition metals, and metal compounds which can form metal nano grains in carbonization, such as metal chlorides containing $CuCl_2$, $COCl_2$, $OsCl_3$, $CrCl_2$, $VCl_3$, $TaCl_2$, $TiCl_4$, $(NH_3)_6RuCl_3$, $ZrCl_4$, $HfCl_4$, $MnCl_2$, $ZnCl_2$, $FeCl_3$, $NiCl_2$, $PdCl_2$ and $MgCl_2$ as metal precursors, metal nitrates such as $Pd(NO_3)_2$, $(NH_3)_4Pt(NO_3)_2$, $Fe(NO_3)_3$, $Ni(NO_3)_2$ and $Mg(NO_3)_2$, and organic metal compounds such as iron acetylacetonate, ferrocene, Palladium (Pd) trioctylphosphine and Nickel (Ni) cyclooctadiene.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

An electrostatic spray or electrospray which sprays a liquid as ultrafine drops in a high voltage electric field over a critical voltage has been publicly known. The electrospray can obtain aerosol consisting of sub micron drops with a narrow size distribution. Therefore, the electrospray has drawn great attention in the scientific and industrial fields. Besides a low viscosity liquid sprayed as fine liquid drops, when a polymer solution or melt having sufficient viscosity receives a high voltage electrostatic force, the electrospray occurs. In this case, not fine liquid drops but fibers are formed. In order to make a distinction from the electrospray of the low viscosity fluid forming fine liquid drops, the electrospray of the high viscosity fluid such as polymers forming fibers is called electrostatic spinning or electrospinning.

Figure 1:
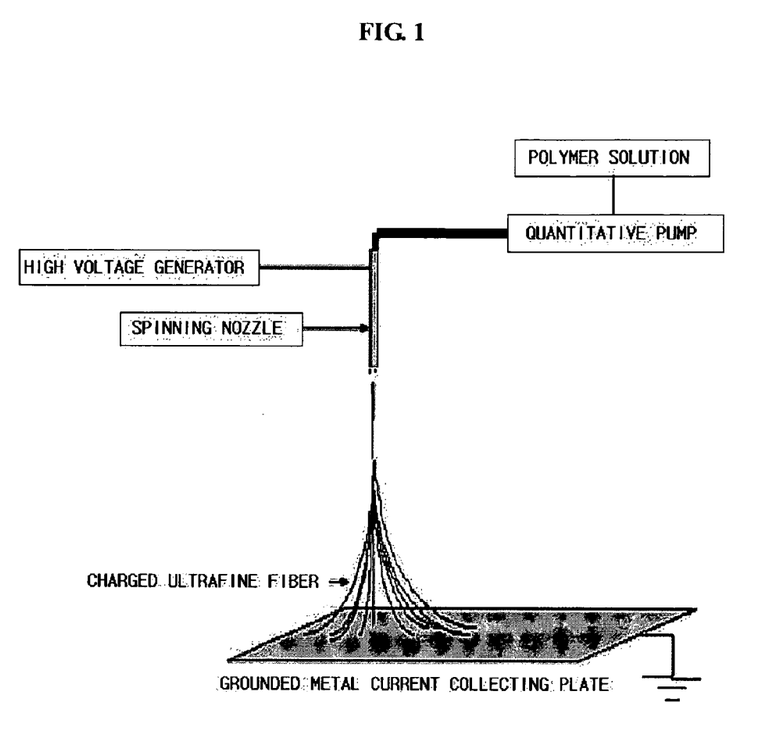
FIG. 1 is a schematic view illustrating electrospinning of halogenated polymers containing a metal catalyst compound.
Figure 2:
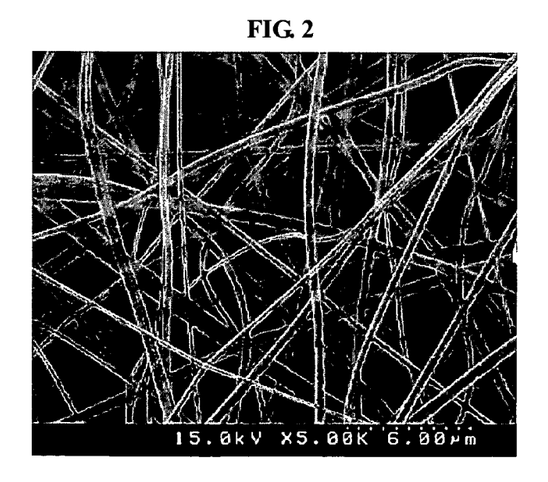
FIG. 2 is an SEM photograph showing an electrospun poly(vinylidene fluoride) ultrafine fiber containing an Fe catalyst compound.

FIG. 1 is a schematic view illustrating an electrospinning device used for the present invention. The electrospinning device includes a barrel for storing a polymer solution, a quantitative pump for discharging the polymer solution at a predetermined speed, and a spinning nozzle connected to a high voltage generator. The polymer solution discharged through the quantitative pump is discharged as an ultrafine fiber through the spinning nozzle electrically charged by the high voltage generator, and collected on a grounded current collecting plate formed in a conveyer type moving at a predetermined speed. As shown in FIG. 2, the electrospinning of the polymer solution can prepare a few nm to a few tens nm of ultrafine fiber. The generated fiber is disposed in a three-dimensional network structure and prepared as a lamination type porous web. The ultrafine fiber web is ultrathin and ultralight. As compared with the general fiber, the ultrafine fiber has a very high surface to volume ratio and high porosity. Accordingly, the ultrafine fiber has a respiration property and a wind protecting property to discharge sweat, and prevents liquid inflow.

Halogenated polymers of the electrospun ultrafine fiber phases are polymers which can be molten. Here, the halogenated polymers are molten by carbonization and the fiber phases are destroyed.

To solve the foregoing problem, a non-melting treatment is carried out to prevent the prepared fiber from being molten in the carbonization. In detail, the melting of the fiber is restricted by dehalogenation using a thermal treatment below 300° C. or a chemical process using strong base.

In order to induce partial dehalogenation to the inside of the ultrafine fiber prepared by the electrospinning, if necessary, the strong base can be added to the halogenated polymer solution. However, if the dehalogenation is excessively performed, the polymer solution is gelated to make it more difficult to perform the electrospinning. In accordance with the present invention, the dehalogenation is controlled not to generate the gelation.

Figure 3:
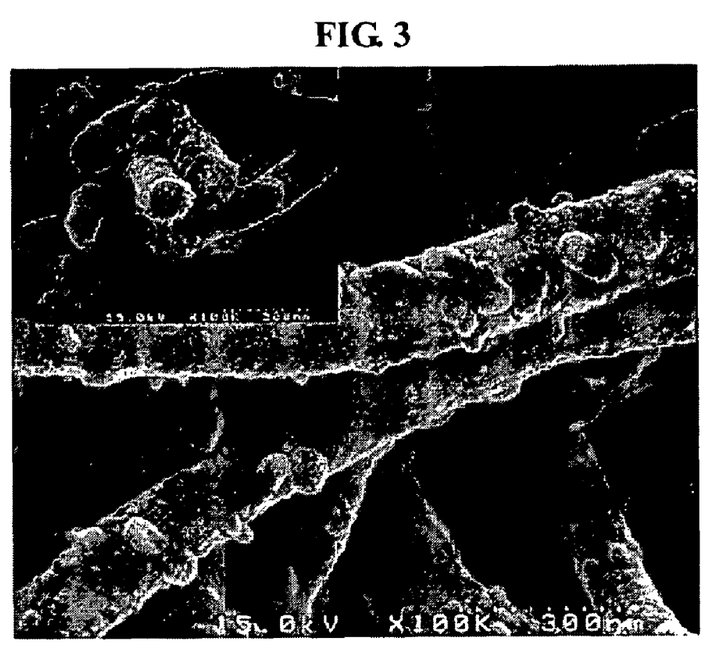
FIG. 3 is an SEM photograph showing an ultrafine porous graphitic carbon fiber prepared by carbonizing the poly(vinylidene fluoride) ultrafine fiber containing the Fe catalyst compound of FIG. 2.

The dehalogenation is carried out by using a strong alkali aqueous solution prepared by dissolving sodium hydroxide or potassium gallium hydroxide. In addition, a strong alkali organic solvent which can swell the ultrafine fiber can be used to evenly perform the dehalogenation to the inside of the ultrafine fiber. For example, the strong alkali organic solvent is prepared by dissolving a strong base containing 1,8-diazabicyclo[5.4.0] undec-7-ene (DBU) which can be easily dissolved in an organic solvent at an appropriate concentration. However, a specific graphitizing catalyst is dissolved in the strong alkali organic solvent and eluted from a precursor fiber in the non-melting treatment. In this case, the strong alkali aqueous solution is preferably used. The dehalogenation by the strong alkali is a very important factor in the structure and porosity of the ultrafine carbon fiber. If the dehalogenation is weakly performed to merely prevent melting, as shown in FIG. 3, a porous graphitic carbon fiber consisting of very small carbon grains and having a large specific surface area is prepared. On the other hand, since a metal compound is converted into a graphitizing catalyst during the carbonization, the graphitization is performed with the carbonization. The small carbon grains of FIG. 3 have a graphitizing structure with high crystallinity. An ultrafine porous graphitic carbon fiber having a very high graphitization degree and a large specific surface area is prepared according to a carbonization temperature.

Identically to the general preparation process of the carbon fiber, the non-melting treated halogenated polymer ultrafine fiber is carbonized in an inert gas or vacuum atmosphere at 300 to 3000° C., more preferably, 700 to 2000° C., thereby preparing an ultrafine porous graphitic carbon fiber having micropores.

The graphitizing catalyst compound is converted into a graphitizing catalyst during the carbonization. In another case, a catalyst forming a metal compound is reduced in a hydrogen or rare hydrogen atmosphere to generate a graphitizing catalyst.

In accordance with the present invention, in order to prepare an ultrafine graphitic activated carbon fiber having a large specific surface area and macropores, the ultrafine carbon fiber is activated in a gas atmosphere such as vapor or carbon dioxide. Here, an activation temperature ranges from 700 to 1000° C.

In addition to the electrospinning, the halogenated polymer ultrafine fiber for preparing the ultrafine porous graphitic carbon fiber can be prepared by a general ultrafine fiber preparation process such as melt-blown and electrostatic blown which is a combination of the electrospinning and the melt-blown.

The present invention will now be explained in more detail by the following examples. These examples are not intended to be limiting.

EXAMPLE 1-1

Preparation of poly(vinylidene fluoride) Ultrafine fiber 17 g of poly(vinylidene fluoride) (PVdF, Kynar 761) and 8.5 g of iron acetylacetonate were added to 100 g of dimethylaceteamide/acetone mixed solution and stirred at the normal temperature, thereby obtaining a transparent polymer solution. The polymer solution was injected into the barrel of the electrospinning device of FIG. 1, and discharged at a predetermined speed by using the quantitative pump. The nozzle was electrically charged by 9 KV by the high voltage generator. An ultrafine fiber of FIG. 2 was formed on the grounded current collecting plate formed in a conveyer type moving at a predetermined speed.

EXAMPLE 1-2

Dehydrofluorination (Non-melting Treatment) of Halogenated Polymer Ultrafine Fiber The PVdF ultrafine fiber prepared in Example 1-1 was put into a 4M aqueous sodium hydroxide aqueous solution maintained at about 70° C. and prepared by dissolving which 0.25 mole tetrabutylammonium bromide was dissolved and maintained at about 70° C., and defluorinated for about one hour, thereby preparing a non-melting treated PVdF ultrafine fiber.

EXAMPLE 1-3

Preparation of Porous Carbon Nano Fiber

Figure 4:
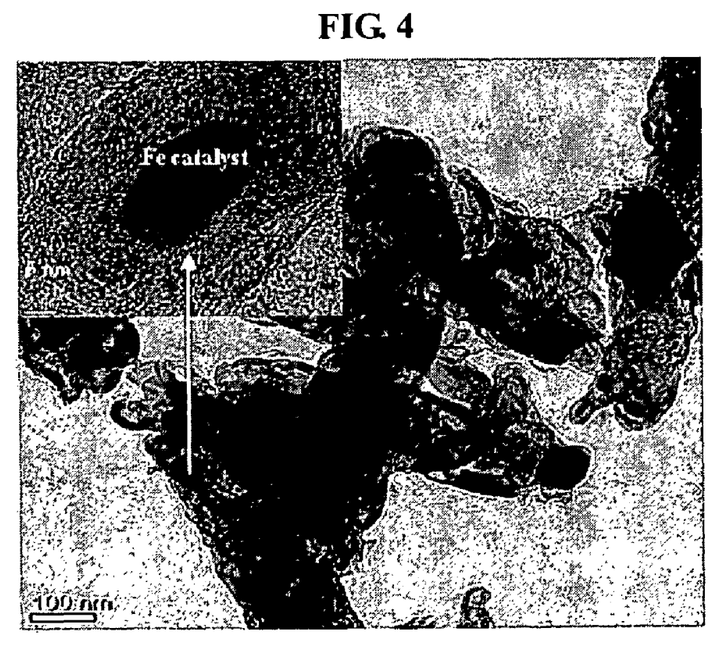
FIG. 4 is an TEM photograph showing the ultrafine porous graphitic carbon fiber prepared by carbonizing the poly(vinylidene fluoride) ultrafine fiber containing the Fe catalyst compound of FIG. 2.

The non-melting treated PVdF ultrafine fiber prepared in Example 1-2 was carbonized in a nitrogen gas atmosphere at a carbonization temperature of 800 to 1800° C. by increasing a heating rate by 3° C./min, thereby preparing a porous ultrafine graphitic carbon fiber of FIG. 3. FIG. 4 is a TEM photograph showing an ultrafine carbon fiber prepared by carbonization at 800° C., especially, development of a graphitic crystal structure by a metal Fe catalyst.

Figure 5:
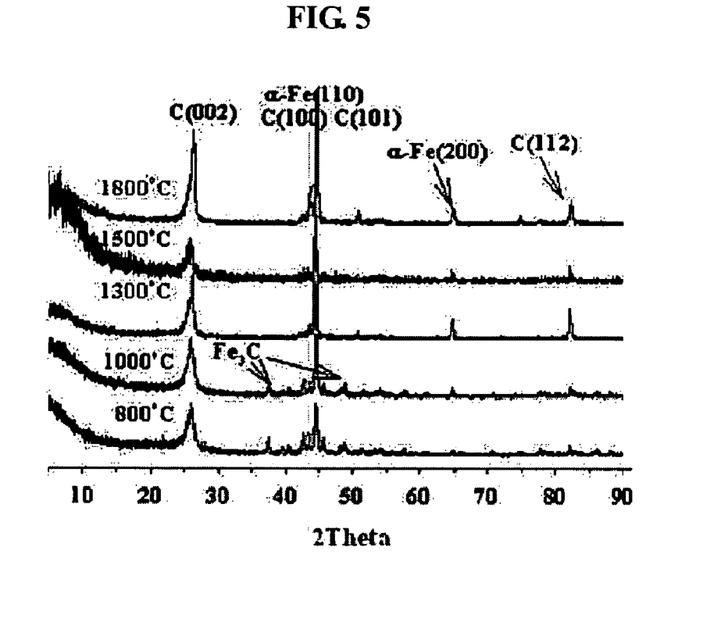
FIG. 5 shows X-ray diffraction curves of an ultrafine porous graphitic carbon fiber prepared by carbonizing a poly(vinylidene chloride) ultrafine fiber containing the Fe catalyst compound of FIG. 2.
Figure 6:
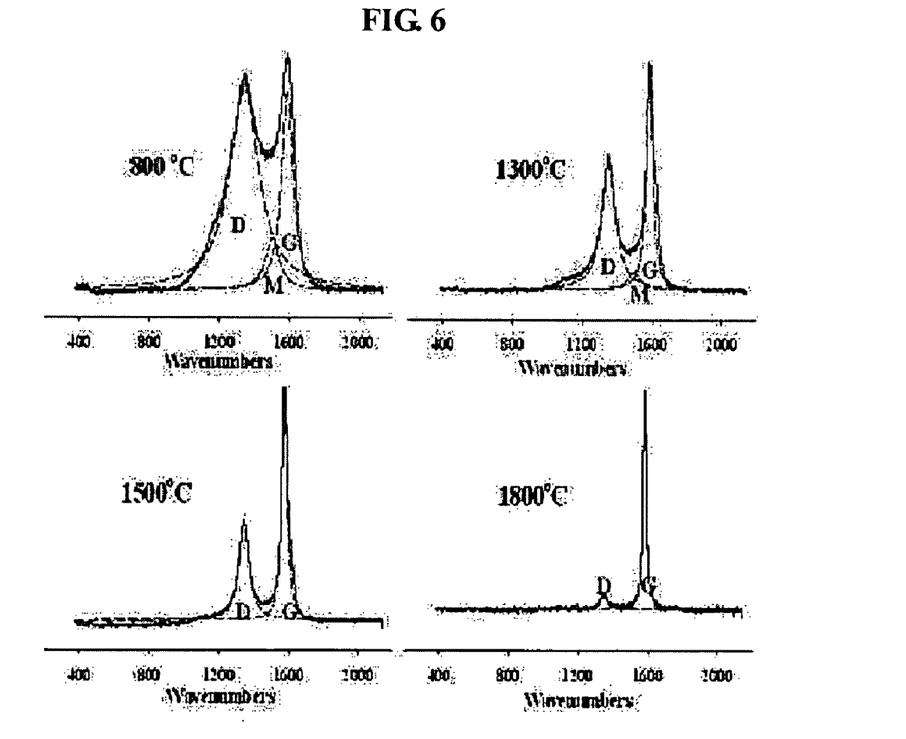
FIG. 6 shows Raman spectra of the ultrafine porous graphitic carbon fiber prepared by carbonizing the poly(vinylidene fluoride) ultrafine fiber containing the Fe catalyst compound of FIG. 2.

FIGS. 5 and 6 show X-ray diffraction curves and Raman spectra of a graphitic carbon fiber prepared at a carbonization temperature of 800 to 1800° C., especially, development of a graphitic structure. Table 1 shows $d_{002}$ and $L_a$ at each preparation temperature of the graphitic carbon fiber. As shown in Table 1, as the carbonization temperature increases, $d_{002}$ and $L_a$ approximate a value of a natural graphite ($d_{002}$=0.3343 nm).

TABLE 1

$d_{002}$ and $L_a$ of prepared graphitic carbon fiber

| Carbonization temperature (° C.) | 2Θ(° C.) | $Dd_{002}$(nm) | $L_a$(nm)$^a$ |
|---|---|---|---|
| 800 | 26.100 | 0.341 | 4.32 |
| 1000 | 25.960 | 0.343 | 4.83 |
| 1300 | 26.120 | 0.341 | 7.50 |
| 1500 | 26.280 | 0.339 | 10.9 |
| 1800 | 26.720 | 0.333 | 72.5 |

$^a L_a$(Raman) = 4.4 (IG/ID)

Table 2 shows BET analysis results of the graphite carbon fiber prepared at the carbonization temperature of 800 to 1800° C.

TABLE 2

BET analysis results

| Carbonization temperature (° C.) | Surface area (m²/g) | Pore size distribution (cm³/g) | | | |
|---|---|---|---|---|---|
| | | <1 nm$^a$ | 1-2 nm$^a$ | 2-4 nm$^b$ | 4-10 nm$^b$ |
| 800 | 473 | 0.162 | 0.042 | 0.132 | 0.294 |
| 1000 | 445 | 0.158 | 0.040 | 0.133 | 0.315 |
| 1300 | 298 | 0.104 | 0.028 | 0.100 | 0.232 |
| 1500 | 431 | 0.143 | 0.048 | 0.132 | 0.186 |
| 1800 | 377 | 0.115 | 0.044 | 0.125 | 0.18 |

$^a$determined by applying the Horvath Kawazoe Pore sizes for microporous samples
$^b$determined by applying the B. J, H pore sizes for mesoporous samples

EXAMPLE 1-4

Preparation of Graphitic Activated Carbon Fiber

The PVdF ultrafine carbon fiber prepared at 1500° C. in Example 1-3 was activated at 850° C. by using $CO_2$ gas, thereby preparing an ultrafine activated carbon fiber.

COMPARATIVE EXAMPLE 1

Figure 7:
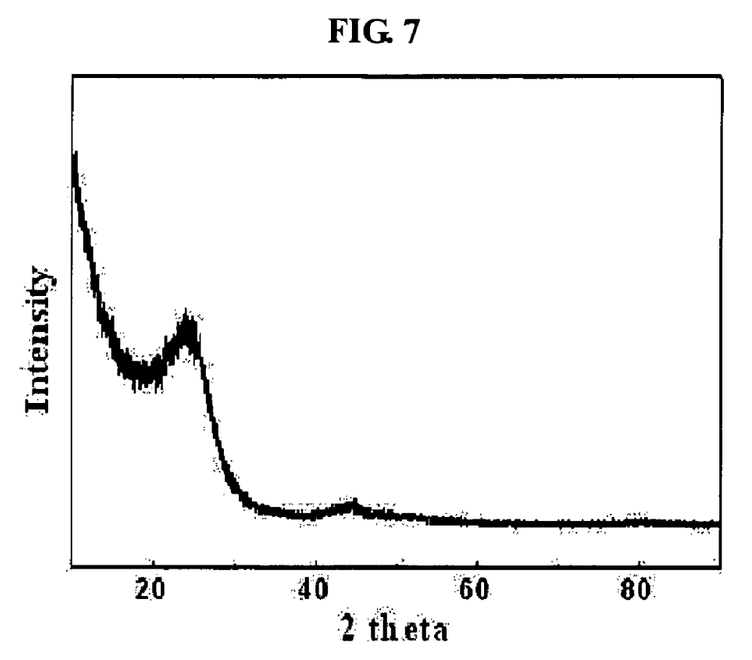
FIG. 7 shows Raman spectra of an ultrafine carbon fiber prepared by carbonizing a poly(vinylidene fluoride) ultrafine fiber which does not contain an Fe catalyst compound.

A PVdF ultrafine fiber which did not contain a metal catalyst compound for graphitization was prepared in the same manner as Example 1-1, and non-melting treated and carbonized at 800° C. in the same manner as Examples 1-2 and 1-3. A specific surface area of the ultrafine fiber was 970 m²/g, which was much larger than that of the graphitic carbon fiber of Example 1-3. However, a graphitic crystal structure was not observed in a TEM photograph of the prepared fiber. As shown in FIG. 7, $d_{002}$ was over 0.37 nm.

EXAMPLE 2-1

17 g of poly(vinylidene fluoride) (PVdF, Kynar 761) and 8.5 g of $NiCl_2$ were added to 100 g of dimethylaceteamide/ acetone mixed solution and stirred at the normal temperature, thereby obtaining a transparent polymer solution. The polymer solution was treated in the same manner as Example 1-1, to form an ultrafine fiber.

EXAMPLE 2-2

Non-melting Treatment

The PVdF ultrafine fiber prepared in Example 2-1 was put into a 4M aqueous sodium hydroxide aqueous solution maintained at about 70° C. and prepared by dissolving which 0.25 mole tetrabutylammonium bromide was dissolved and maintained at about 70° C., and defluorinated for about one hour, thereby preparing a non-melting treated PVdF ultrafine fiber.

EXAMPLE 2-3

Preparation of Porous Graphitic Carbon Fiber

Figure 8:
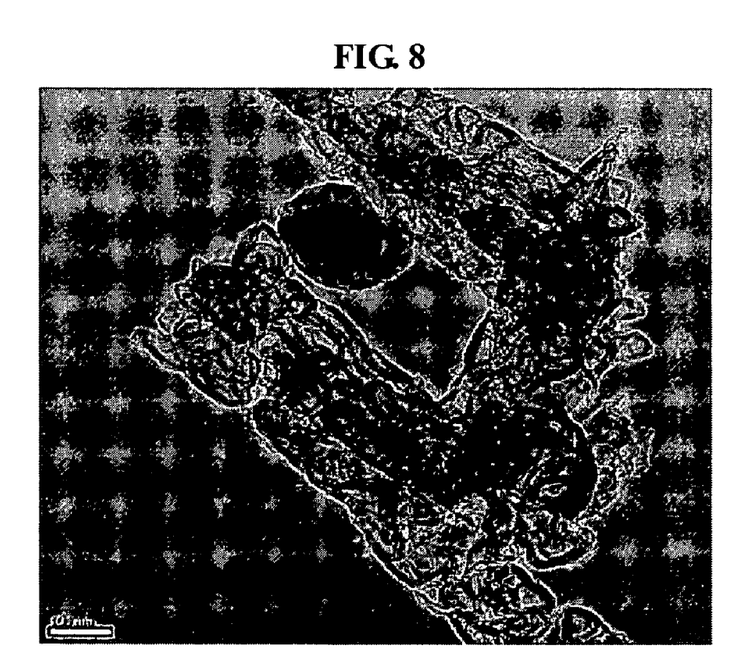
FIG. 8 is a TEM photograph showing an ultrafine graphitic carbon fiber prepared by carbonizing a poly(vinylidene fluoride) ultrafine fiber containing an Ni catalyst compound.

The non-melting treated PVdF ultrafine fiber prepared in Example 2-2 was carbonized in a nitrogen gas atmosphere at a carbonization temperature of 700° C. by increasing a heating rate by 3° C./min, thereby preparing a porous ultrafine graphitic carbon fiber. FIG. 8 is a TEM photograph showing the ultrafine graphitic carbon fiber, especially, development of a graphitic crystal structure by a metal Ni catalyst. Here, $d_{002}$ and $L_a$ were 0.340 nm and 27.2 nm, respectively.

EXAMPLE 3

17 g of poly(vinylidene fluoride) (PVdF, Kynar 761) and 8.5 g of $H_2PtCl_5$ were added to 100 g of dimethylaceteamide/ acetone mixed solution and stirred at the normal temperature, thereby obtaining a transparent polymer solution. The prepared polymer solution was treated in the same manner as Example 1-1, to form an ultrafine fiber. The ultrafine fiber was non-melting treated in the same manner as Example 1-2, carbonized at about 800° C., reduced in a rare hydrogen gas atmosphere to form a Pt catalyst, and carbonized at 1500° C. The ultrafine carbon fiber did not have a graphitizing structure. However, in the prepared carbon nano fiber, Pt nano grains coexisted.

As discussed earlier, the present invention provides the porous ultrafine graphitic carbon fiber of the halogenated polymers which cannot be easily prepared by the general fiber preparation process. The porous ultrafine graphitic carbon fiber has a large specific surface area, micropores and macropores, and thus is used as a carbon material for storing hydrogen, an adsorbing material of biochemically noxious substances, an electrode material of a super capacitor, a secondary cell and a fuel cell, and a catalyst carrier material.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A porous graphitic carbon fiber, which is prepared by carbonizing a halogenated polymer fiber containing a graphitizing metal catalyst and having a diameter of 10 nm to 3000 nm, $d_{002}$ below 0.36 nm, a specific surface area of 298 m²/g or more and contains both micropores and mesopores.

2. The porous graphitic carbon fiber as claimed in claim 1, wherein the halogenated polymer is any one selected from the group consisting of single polymers and copolymers of fluorine, single polymers and copolymers of halogenated monomers, and mixtures thereof.

3. The porous graphitic carbon fiber as claimed in claim 1, wherein the graphitizing metal catalyst is at least one selected from the group consisting of (1) nano grains of transition metals, non-transition metals, and mixtures of Mg and the transition metals, and (2) metal chlorides metal nitrates, and organic metal compounds.

4. The porous graphitic carbon fiber as claimed in claim 2, wherein the single polymers and copolymers of fluorine are poly(vinylidene fluoride), poly(vinylidenefluoride-co-hexafluoropropylene), poly(vinylidenefluoride-co-tetrafluoro ethylene), poly(vinylidene fluoride-co-trifluoroethylene) and perfluoropolymers, and the single polymers and copolymers of halogenated monomers are poly(vinyl chloride), poly(vinylidene chloride), poly(vinylidenechloride-co-vinylchloride) and saran polymers.

5. The porous graphitic carbon fiber as claimed in claim 3, wherein the transition metals are Pt, Ru, Cu, Fe, Ni, Co, Pd, W, Ir, Rh, Sr, Ce, Pr, Nd, Sm and Re, mixtures thereof, and the non-transition metals are Mg, B and Al, and the metal chlorides are $CuCl_2$, $CoCl_2$, $OsCl_3$, $CrCl_2$, $VCl_3$, $TaCl_2$, $TiCl_4$, $(NH_3)_6RuCl_3$, $ZrCl_4$, $HfCl_4$, $MnCl_2$, $ZnCl_2$, $FeCl_3$, $NiCl_2$, $PdCl_2$ and $MgCl_2$, and the metal nitrates are $Pd(NO_3)_2$, $(NH_3)_4Pt(NO_3)_2$, $Fe(NO_3)_3$, $Ni(NO_3)_2$ and $Mg(NO_3)_2$, and the organic metal compounds are iron acetylacetonate, ferrocene, palladium trioctylphosphine and nickel cyclooctadiene.

6. A fabrication method of an porous graphitic carbon fiber, comprising the steps of:
fabricating a halogenated polymer fiber by using halogenated polymers containing a graphitizing metal catalyst or a graphitizing metal catalyst compound;
performing a non-melting treatment on the halogenated polymer fiber; and
carbonizing the non-melting treated fiber,
wherein the porous graphitic carbon fiber has a diameter of 10 nm to 3000 nm, $d_{002}$ below 0.36 nm, and a specific surface area of 298 m²/g or more and contains both micropores and mesopores.

7. The fabrication method of the porous graphitic carbon fiber as claimed in claim 6, wherein the halogenated polymer fiber is fabricated by electrospinning, melt-blow or electroblown.

8. The fabrication method of the porous graphitic carbon fiber as claimed in claim 6, wherein the diameter of the halogenated polymer fiber ranges from 10 to 3000 nm.

9. The fabrication method of the porous graphitic carbon fiber as claimed in claim 6, wherein the halogenated polymer is any one selected from the group consisting of single polymers and copolymers of fluorine, single polymers and copolymers of halogenated monomers, and mixtures thereof.

10. The fabrication method of the porous graphitic carbon fiber as claimed in claim 6, wherein the graphitizing metal catalyst is at least one selected from the group consisting of (1) nano grains of transition metals, nontransition metals, and mixtures of Mg and the transition metals, and (2) metal chlorides metal nitrates, and organic metal compounds.

11. The fabrication method of the porous graphitic carbon fiber as claimed in claim 6, wherein the non-melting treatment thermally treats the halogenated polymer fiber below 300° C. before carbonization.

12. The fabrication method of the porous graphitic carbon fiber as claimed in claim 6, wherein the non-melting treatment chemically dehalogenates the halogenated polymer fiber by using a strong alkali aqueous solution or a strong alkali organic solution before carbonizing the halogenated polymer fiber.

13. The fabrication method of the porous graphitic carbon fiber as claimed in claim 6, wherein the carbonization carbonizes the non-melting treated halogenated polymer fiber in an inert gas or vacuum atmosphere at 300 to 3000° C. with graphitization.

14. The fabrication method of the porous graphitic carbon fiber as claimed in claim 6, further comprising a step for activating the halogenated polymer fiber at 700 to 1000° C. after the carbonization.

15. The fabrication method of the porous graphitic carbon fiber as claimed in claim 9, wherein the single polymers and copolymers of fluorine are poly(vinylidene fluoride), poly(vinylidenefluoride-co-hexafluoropropylene), poly(vinylidenefluoride-co-tetrafluoro ethylene), poly(vinylidene fluoride-co-trifluoroethylene) and perfluoropolymers, and the single polymers and copolymers of halogenated monomers are poly(vinyl chloride), poly(vinylidene chloride), poly(vinylidenechloride-co-vinylchloride) and saran polymers.

16. The fabrication method of the porous graphitic carbon fiber as claimed in claim 10, wherein the transition metals are Pt, Ru, Cu, Fe, Ni, Co, Pd, W, Ir, Rh, Sr, Ce, Pr, Nd, Sm and Re, mixtures thereof, and the non-transition metals are Mg, B and Al, and the metal chlorides are $CuCl_2$, $CoCl_2$, $OsCl_3$, $CrCl_2$, $VCl_3$, $TaCl_2$, $TiCl_4$, $(NH_3)_6RuCl_3$, $ZrCl_4$, $HfCl_4$, $MnCl_2$, $ZnCl_2$, $FeCl_3$, $NiCl_2$, $PdCl_2$ and $MgCl_2$, and the metal nitrates are $Pd(NO_3)_2$, $(NH_3)_4Pt(NO_3)_2$, $Fe(NO_3)_3$, $Ni(NO_3)_2$ and $Mg(NO_3)_2$, and the organic metal compounds are iron acetylacetonate, ferrocene, palladium trioctylphosphine and nickel cyclooctadiene.

* * * * *